(12) United States Patent
Lee et al.

(10) Patent No.: US 10,929,002 B2
(45) Date of Patent: Feb. 23, 2021

(54) ELECTRONIC DEVICE FOR CONTROLLING A PLURALITY OF APPLICATIONS

(71) Applicant: Samsung Electronics Co., Ltd., Gyeonggi-do (KR)

(72) Inventors: Bona Lee, Gyeonggi-do (KR); Daeun Park, Gyeonggi-do (KR); Joonhwan Kim, Gyeonggi-do (KR); Hanna Kim, Gyeonggi-do (KR); Ahreum Nam, Gyeonggi-do (KR); Sungho Park, Gyeonggi-do (KR); Jihun Lee, Gyeonggi-do (KR); Hyemi Lee, Gyeonggi-do (KR); Jinkyo Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/247,774

(22) Filed: Jan. 15, 2019

(65) Prior Publication Data

US 2019/0227703 A1 Jul. 25, 2019

(30) Foreign Application Priority Data

Jan. 22, 2018 (KR) .................. 10-2018-0007777

(51) Int. Cl.
*G06F 3/048* (2013.01)
*G06F 3/0485* (2013.01)
(Continued)

(52) U.S. Cl.
CPC ........ *G06F 3/04855* (2013.01); *G06F 3/0482* (2013.01); *G06F 3/0485* (2013.01);
(Continued)

(58) Field of Classification Search
CPC ........................ G06F 3/04855; G06F 3/0482
See application file for complete search history.

(56) References Cited

U.S. PATENT DOCUMENTS 8,275,420 B2 9/2012 Lim
8,493,344 B2 7/2013 Fleizach et al.
(Continued)

FOREIGN PATENT DOCUMENTS

KR 20100028343 A * 3/2010 ............... H04B 1/38
KR 10-2010-0070819 A 6/2010
(Continued)

OTHER PUBLICATIONS

International Search Report dated Apr. 26, 2019.
Korean Search Report dated Jun. 17, 2019.

*Primary Examiner* — Di Xiao
(74) *Attorney, Agent, or Firm* — Cha & Reiter, LLC

(57) ABSTRACT

An electronic device includes a cover glass, a back cover facing the cover glass, a display including a rigid area exposed through the cover glass, in which a first application is output, and a ductile area extending from the rigid area, and a processor electrically connected to the display. When at least a portion of the ductile area is exposed, the processor may output the first application in a first area which is a portion of the rigid area and the ductile area and a second application in a second area which is a remaining portion of the rigid area.

20 Claims, 7 Drawing Sheets

(51) Int. Cl.
  *G06F 3/0482* (2013.01)
  *G06F 3/0488* (2013.01)
  *G06F 21/31* (2013.01)
  *G09G 3/22* (2006.01)

(52) U.S. Cl.
  CPC ...... *G06F 3/04883* (2013.01); *G06F 3/04886* (2013.01); *G06F 21/31* (2013.01); *G09G 3/22* (2013.01); *G06F 2221/2149* (2013.01); *G09G 2320/0626* (2013.01)

(56) References Cited

U.S. PATENT DOCUMENTS

| | | |
|---|---|---|
| 8,681,106 B2 | 3/2014 | Fleizach et al. |
| 9,009,612 B2 | 4/2015 | Fleizach et al. |
| 10,061,507 B2 | 8/2018 | Fleizach et al. |
| 10,203,863 B2 | 2/2019 | Kwon et al. |
| 2010/0167791 A1 | 7/2010 | Lim |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2012/0005602 A1* | 1/2012 | Anttila .................. G06F 3/1431 715/761 |
| 2012/0327009 A1 | 12/2012 | Fleizach |
| 2014/0089833 A1 | 3/2014 | Hwang et al. |
| 2014/0096069 A1* | 4/2014 | Boblett .................. G06F 3/017 715/783 |
| 2014/0218375 A1* | 8/2014 | Kim ....................... G06F 3/147 345/501 |
| 2014/0297647 A1* | 10/2014 | Shim .................. H04M 1/72552 707/740 |
| 2014/0365933 A1* | 12/2014 | Wu ..................... G06F 3/04817 715/769 |
| 2015/0186710 A1* | 7/2015 | Ahn ................... G06K 9/00087 382/124 |
| 2015/0331593 A1* | 11/2015 | Lee ....................... G06F 1/1677 345/667 |
| 2015/0365306 A1* | 12/2015 | Chaudhri ............. G06F 3/0416 715/736 |
| 2016/0070433 A1 | 3/2016 | Fleizach et al. |
| 2016/0361035 A1* | 12/2016 | Lee ........................ A61B 6/465 |
| 2017/0061932 A1* | 3/2017 | Kwon .................. G06F 3/0412 |
| 2017/0222178 A1 | 8/2017 | Kang et al. |

FOREIGN PATENT DOCUMENTS

| | | | |
|---|---|---|---|
| KR | 20130054072 A * | 5/2013 | ............ G06F 3/048 |
| KR | 10-2017-0090295 A | 8/2017 | |

\* cited by examiner

ELECTRONIC DEVICE FOR CONTROLLING A PLURALITY OF APPLICATIONS

CROSS-REFERENCE TO RELATED APPLICATION(S)

This application is based on and claims priority under 35 U.S.C. § 119 to Korean Patent Application No. 10-2018-0007777, filed on Jan. 22, 2018, in the Korean Intellectual Property Office, the disclosure of which is incorporated by reference herein its entirety.

BACKGROUND

1. Field

The present disclosure generally relates to technology that controls a plurality of applications.

2. Description of Related Art

In recent years, portable devices, such as smartphones, have been equipped with increasingly larger screens. To provide a large screen while still maintaining a relatively small form factor for the device, rollable displays are actively being developed. When the electronic device (e.g., smartphone) includes a rollable display, one area or portion of the rollable display may be always exposed on the exterior of the device, while the remaining portion of the rollable display may be rolled into the electronic device.

The user may activate the entire area of the rollable display by rolling out the rollable display. For instance, when the rollable display is rolled up, the user may slide the rollable display to unroll or unfurl the display, such that the rolled up portion of the display may be exposed. The user may then execute application "A" in the always-exposed portion of the display and application "B" in the unrolled portion of the display.

The above information is presented as background information only to assist with an understanding of the present disclosure. No determination has been made, and no assertion is made, as to whether any of the above might be applicable as prior art with regard to the present disclosure.

SUMMARY

Once the display is unrolled, the user may perform operations over the entire area of the rollable display. For instance, the user may directly touch one area of the display to execute various functions of application "A." In addition, the user may directly touch another area of the display to execute various functions of application "B." However, when the rollable display is expanded or unrolled, the distance between one or more areas of the display and the user's fingers may be too long, i.e. the display when unrolled may be too large for comfortable operation when the device is held by one hand of the user. In this case, and the user is not able to easily control the areas of the display that are out of reach. When this happens, the user is inconvenienced.

Aspects of the present disclosure are to address at least the above-mentioned problems and/or disadvantages and to provide at least the advantages described below. Accordingly, an aspect of the present disclosure is to provide an electronic device to solve the above-mentioned problems and subjects raised in the present disclosure.

In accordance with an aspect of the present disclosure, an electronic device includes a cover glass, a back cover facing the cover glass, a display including a rigid area exposed through the cover glass, in which a first application is output, and a ductile area extending from the rigid area, and a processor electrically connected to the display. When at least a portion of the ductile area is exposed due to a pressure applied to the cover glass or the back cover, the processor outputs the first application in a first area which is a portion of the rigid area and the ductile area, outputs a second application in a second area which is a remaining portion of the rigid area, and outputs a navigation bar in the ductile area, the navigation bar used to control display of content in the first area and the second area.

In accordance with another aspect of the present disclosure, an electronic device includes a cover glass, a back cover facing the cover glass, a display including a rigid area exposed through the cover glass, in which a first application is output, and a ductile area extending from the rigid area, and a processor electrically connected to the display. When at least a portion of the ductile area is exposed due to a pressure applied to the cover glass or the back cover, the processor outputs a second application in the ductile area and outputs a navigation bar in the ductile area, the navigation bar used to control display of content in the rigid area and the ductile area.

According to embodiments disclosed in the present disclosure, convenience to the user may be improved.

Other aspects, advantages, and salient features of the disclosure will become apparent to those skilled in the art from the following detailed description, which, taken in conjunction with the annexed drawings, discloses certain embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
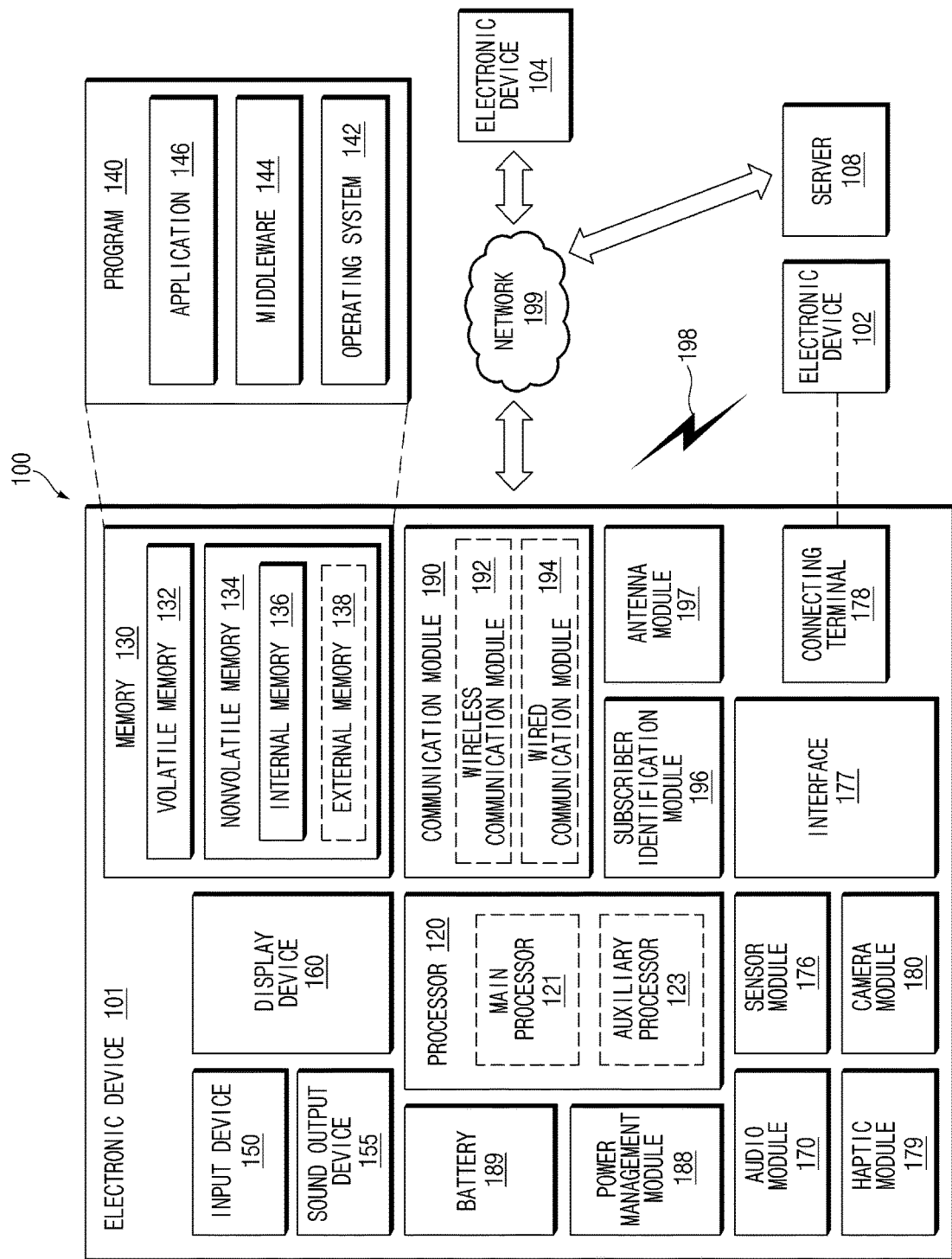
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
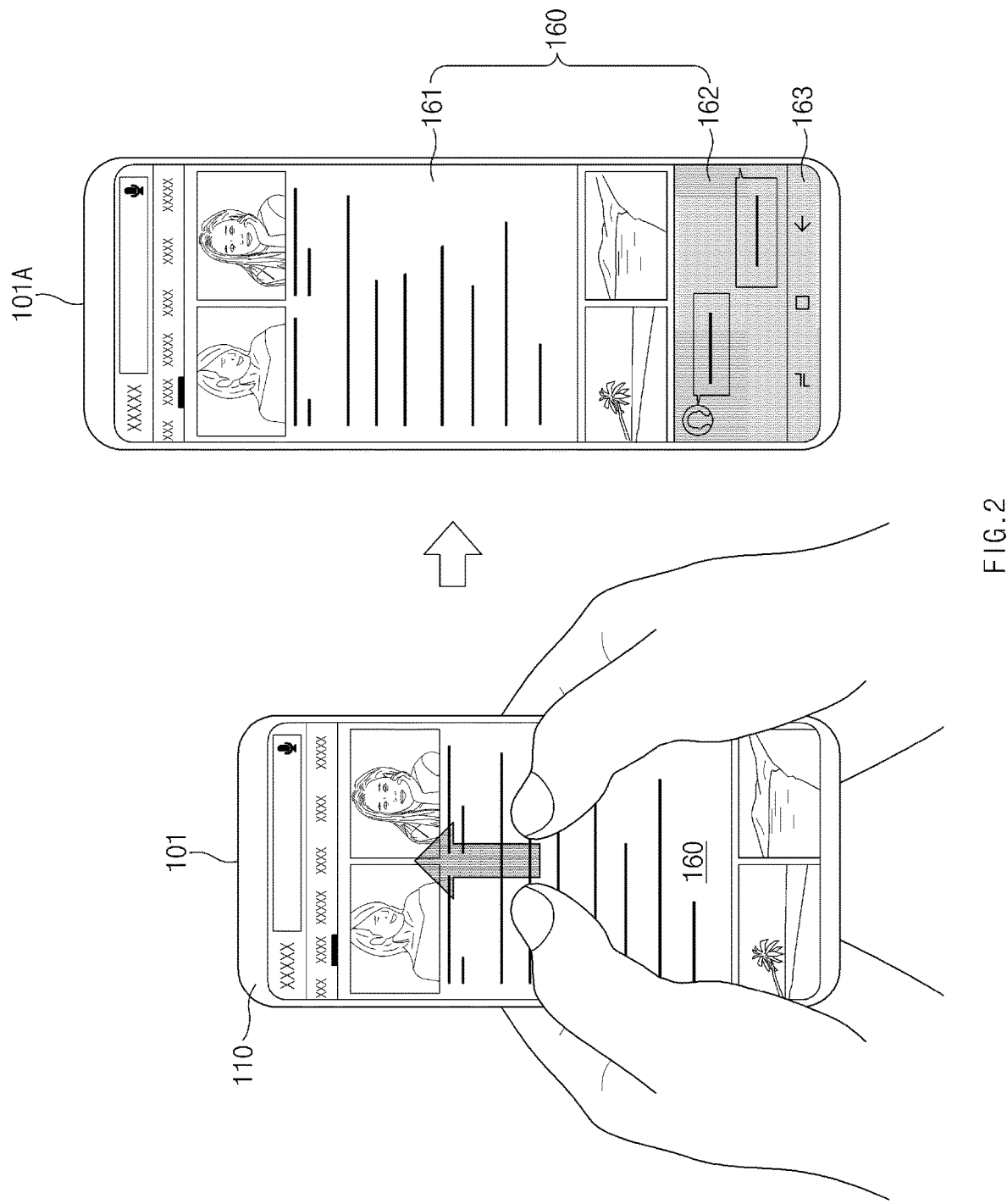
FIG. 2 are views illustrating an electronic device according to an embodiment.

FIG. 2 are views illustrating an electronic device according to an embodiment.

Referring to FIG. 2, the electronic device 101 shown in the left side of the figure is in a state before the user expands the display 160. The electronic device 101A shown in the right side of the figure is in a state after the user expands the display 160. For instance, when the user slides the display 160 using his/her finger while supporting the electronic device 101 with the user's hands, an area 162 of the display 160 placed inside the electronic device 101 may be exposed so that it is visible from the outside of the electronic device 101A.

The electronic device 101 may include a flexible housing 110 and a flexible display 160 that can be expanded by user operation. In the present disclosure, the flexible housing 110 and the flexible display 160 may be referred to as "housing 110" and "display 160," respectively.

The housing 110 may include a cover glass, a side surface member, and a back cover. The cover glass, the side surface member, and the back cover may include a ductile area that can be expanded when the user applies pressure to the area. In another embodiment, the cover glass, the side surface member, and the back cover may include an additional area, and when the pressure is applied to the additional area while the additional area is folded (or curved), the additional area may be stretched and expanded.

The display 160 may include a rigid area 161 and the ductile area 162. The rigid area 161 may be the area that is always exposed on the exterior of the electronic device 101A. The ductile area 162 may be the remaining area that is only exposed when the user applies pressure to unroll the display 160.

When the rigid area 161 and the ductile area 162 are exposed, i.e. when the display 160 is unrolled, the electronic device 101A may output different applications in the rigid area 161 and the ductile area 162. For instance, when the user expands the display 160 when the electronic device 101 is currently outputting an Internet browser in the rigid area 161, the electronic device 101A may continue to output the Internet browser in the rigid area 161 and may output a message application in the ductile area 162.

According to an embodiment, the electronic device 101A may output a navigation bar 163 with the application in the ductile area 162. In the present disclosure, the navigation bar 163 may be a status bar used to control what content is displayed on the display 160. The user may touch various keys included in the navigation bar 163 to control the output through the rigid area 161 and/or the ductile area 162.

The user may control the application displayed in the rigid area 161 by directly touching portions of the rigid area 161. However, since the distance between the user's hands and the rigid area 161 is increased when the display 160 is expanded or unrolled, the user may not able to easily control the application output through the rigid area 161 because portions of the rigid area 161 may be hard to reach. According to one or more embodiment of the present disclosure, the user may control applications or content displayed in the rigid area 161 and/or the ductile area 162 using the navigation bar 163 output in the ductile area 162, and thus convenience to be user may be improved.

In the present disclosure, descriptions of the electronic device 101 in connection with FIG. 1 may also be applicable to electronic device 101 in FIG. 2.

Figure 3:
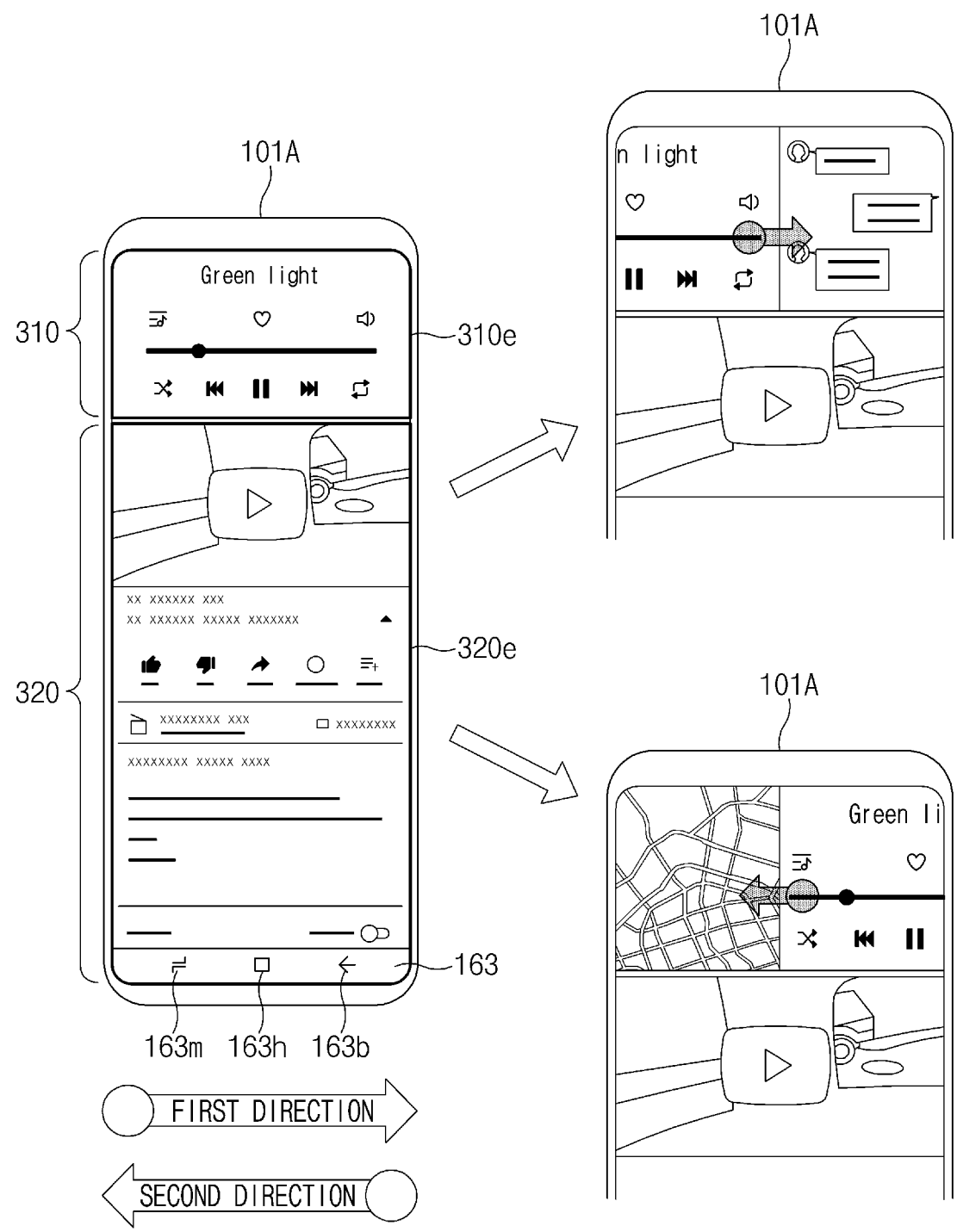
FIG. 3 are views illustrating various operations of an electronic device according to an embodiment.

FIG. 3 are views illustrating various operations of an electronic device according to an embodiment.

Viewing FIG. 3 in the context of FIG. 2, FIG. 2 illustrates an embodiment in which different applications are output in the rigid area 161 and the ductile area 162. Similarly, embodiments described hereinafter relates examples in which one application is output in one portion of the rigid area 161 and another application is output in another portion of the rigid area 161 and the ductile area 162. For instance, the first area 310 may be the portion of the rigid area 161, and the second area 320 may be the other portion of the rigid area 161 together with the ductile area 162. In the present disclosure, the first area 310 may be referred to as an "extra screen."

Referring to FIG. 3, the electronic device 101A may output different applications in the first area 310 and the second area 320. For instance, prior to the display 160 being expanded, the electronic device 101 may be outputting a YouTube video in a YouTube application. When the user expands the display 160 while the YouTube video is output, the electronic device 101A may output a music application in the first area 310 and may output the YouTube video in the second area 320. This way, the size of the output screen for the YouTube video may be maintained even though the display 160 is expanded.

According to an embodiment, the user may select an area to be controlled among the first area 310 and the second area 320. Hereinafter, such an area may be referred to as a "control area." For instance, when the user wants to control the music application, the user may touch the first area 310. When the user touches the first area 310, the electronic device 101A may set the first area 310 as the control area. In addition, when the user touches the first area 310, the electronic device 101A may control the edge 310e of the first area 310 to emit light of a designated color or brightness. This way, the user be provided with visual feedback as to where the control area is.

When the control area is set, the electronic device 101A may control the control area based on the user's input provided through the navigation bar 163. For instance, when the user swipes the navigation bar 163 in a first direction, the application output through the first area 310 may be changed from the music application to a chatting application. As another embodiment, when the user swipes the navigation bar 163 in a second direction, the application output through the first area 310 may be changed from the music application to a map application.

As another embodiment, the user may select the second area 320 to be the control area. For instance, in a case where the user wants to control the YouTube video, the user may touch the second area 320. When the user touches the second area 320, the electronic device 101A may set the second area 320 as the control area. In addition, when the user touches the second area 320, the electronic device 101A may control the edge 320e of the second area 320 to emit light in a designated color, thereby providing visual feedback to the user as to where the control area is.

When the control area is set, the electronic device 101A may control the control area based on the user's input provided through the navigation bar 163. For instance, when the user touches a home key 163h, the electronic device 101A may output a home screen in the second area 320. When the user touches a back key 163b, the electronic device 101A may output, in the second area 320, a previous screen that was displayed in the second area 320. When the user touches a menu key 163m, the electronic device 101A may output in the second area 320 a list of recently executed applications.

The user may control the application displayed in the first area by directly touching the first area. However, since the distance between the user's hands and the first area is increased when the display is expanded or unrolled, the user may not be able to easily control the application output in the first area. According to one or more embodiment of the present disclosure, the user may control the first area 310 and/or the second area 320 using the navigation bar 163 output in the second area 320, and thus convenience to the user may be improved.

Figure 4:
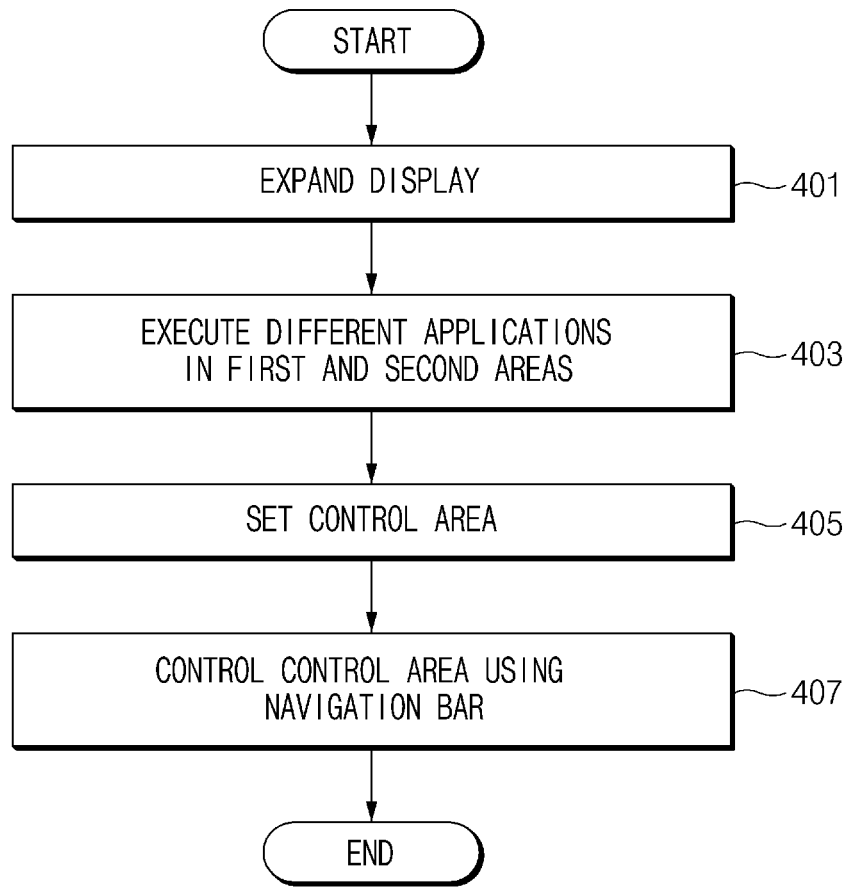
FIG. 4 is a flowchart illustrating an operation of an electronic device according to an embodiment.

FIG. 4 is a flowchart illustrating an operation of an electronic device according to an embodiment. For example, FIG. 4 shows an operation of the electronic device 101A shown in FIG. 3.

Referring to FIG. 4, the electronic device 101A may detect whether the display 160 is expanded based on detecting the pressure applied to the display 160 (operation 401). For instance, when the user slides the display 160 while the ductile area 162 is rolled inside the electronic device 101, the ductile area 162 may be exposed to the exterior of the electronic device 101A. When the ductile area 162 is exposed to the exterior of the electronic device 101A, the electronic device 101A may continue onto operation 403.

In operation 403, the electronic device 101A may output different applications in the first area 310 and the second area 320. For instance, assume that the YouTube video was output before the display 160 is expanded. In this case, the electronic device 101A may output a designated application (e.g., the music application) in the first area 310 and may output the YouTube video in the second area 320. The designated application as well as the designation may be stored in the memory 130 shown in FIG. 1.

According to an embodiment, the electronic device 101A may output the navigation bar 163 in the second area 320. In the embodiment, the electronic device 101A may output the navigation bar 163 at the bottom of the output screen for the YouTube video, as shown in FIG. 3. The navigation bar 163 may include a plurality of keys used to control the applications output in the first area 310 and the second area 320.

In operation 405, the electronic device 101A may set the control area. For instance, when the user touches one of the first area 310 and the second area 320, the electronic device 101A may set the touched area by the user as the control area. In addition, the electronic device 101A may control the edge (e.g., 310e or 320e of FIG. 3) of the touched area to emit light in a designated color to indicate to the user where the control area is.

In operation 407, the electronic device 101A may control the control area through the navigation bar 163. For instance, when the first area 310 is set as the control area and the user swipes the navigation bar 163, the electronic device 101A may change the application output in the first area 310. As another embodiment, when the second area 320 is set as the control area and the user touches the home key 163h of the navigation bar 163, the electronic device 101A may output the home screen in the second area 320.

Figure 5:
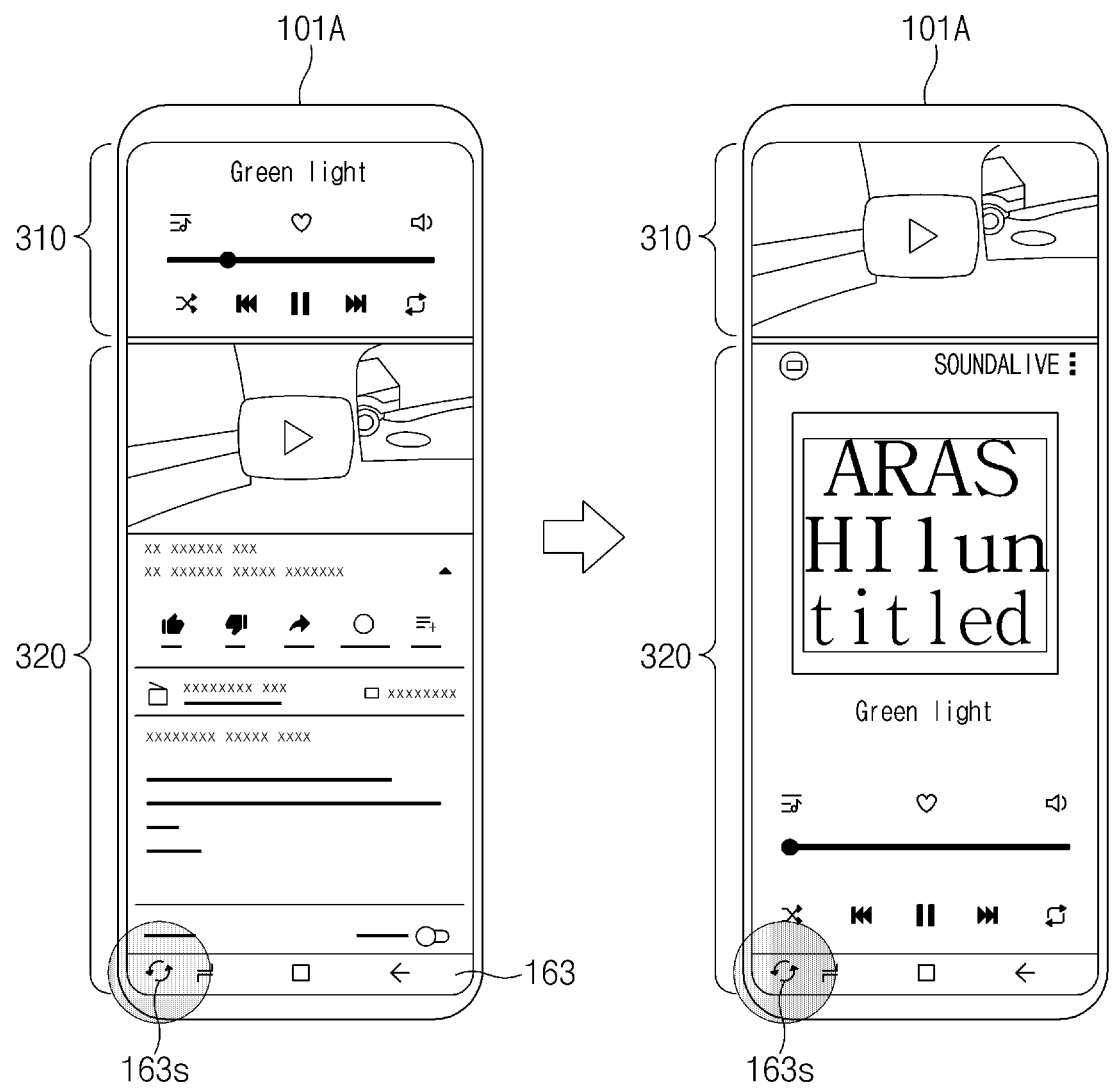
FIG. 5 are views illustrating an operation of an electronic device according to another embodiment.

FIG. 5 are views illustrating an operation of an electronic device according to another embodiment.

Referring to FIG. 5, the electronic device 101A may output different applications in the first area 310 and the second area 320. For instance, the electronic device 101 may be outputting a YouTube video before the display 160 is expanded. When the user expands the display 160 while the YouTube video is output, the electronic device 101A may output the music application in the first area 310 and may output the YouTube video in the second area 320.

According to an embodiment, the navigation bar 163 may include a switch key 163s that allows the user to change the positions of the applications. For instance, when the user touches the switch key 163s, the position of the application output in the first area 310 and the position of the application output in the second area 320 may be changed. In the embodiment, when the user touches the switch key 163s, the electronic device 101A may output the YouTube video in the first area 310 and may output the music application in the second area 320.

Conventionally, the user may change the positions of applications by directly touching the first area and the second area. However, according to an embodiment of the present disclosure, the user may change the positions of the applications by touching the switch key 163s, and thus convenience to the user may be improved.

Figure 6:
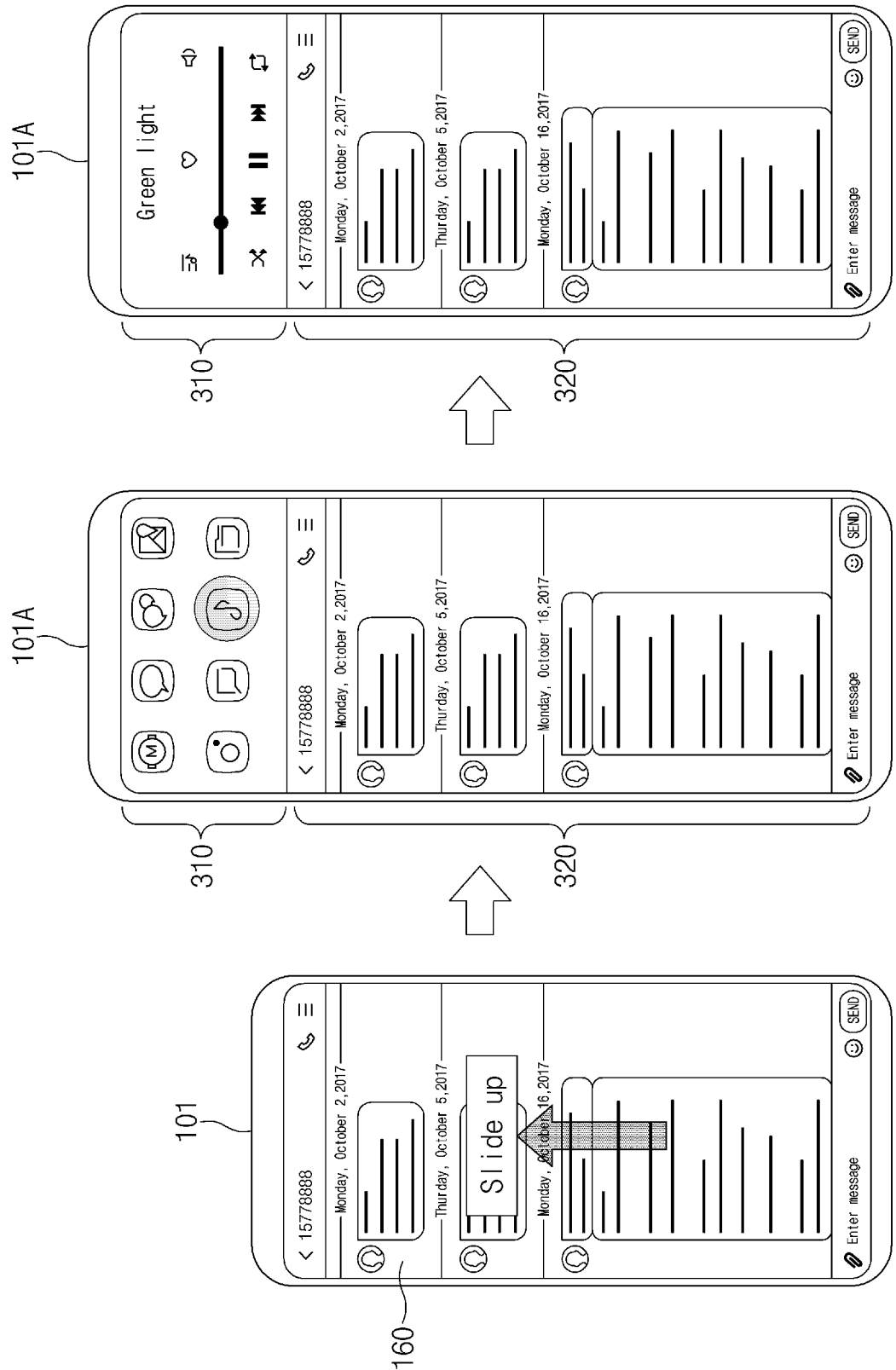
FIG. 6 are views illustrating an operation of an electronic device according to another embodiment.

FIG. 6 are views illustrating an operation of an electronic device according to another embodiment.

Referring to FIG. 6, when the display 160 is expanded, the electronic device 101A may output a designated application list in the first area 310. When the user selects one application in the designated application list, the electronic device 101A may output the selected application in the first area 310. The designated application list may be stored in the memory 130 of FIG. 1 when the electronic device 101 is manufactured and may be changed by the user.

For instance, as shown in FIG. 6, the electronic device 101A may be outputting a message application before the display 160 is expanded. When the user expands the display 160, the electronic device 101A may output the designated application lists in the first area 310 and may output the message application in the second area 320. In this case, the size of the screen through which the message application is output (or the size of the second area 320) may be substantially the same as the size of the screen (or the size of the rigid area 161) before the display 160 is expanded.

When the designated application list is output, the user may select one application in the list. For instance, when the user touches a music application icon, the electronic device 101A may output the music application in the first area 310. In this case, the application output through the second area 320 may be maintained. Thus, in the embodiment, the message application may be output in the second area 320 while the music application is output in the first area 310.

Figure 7:
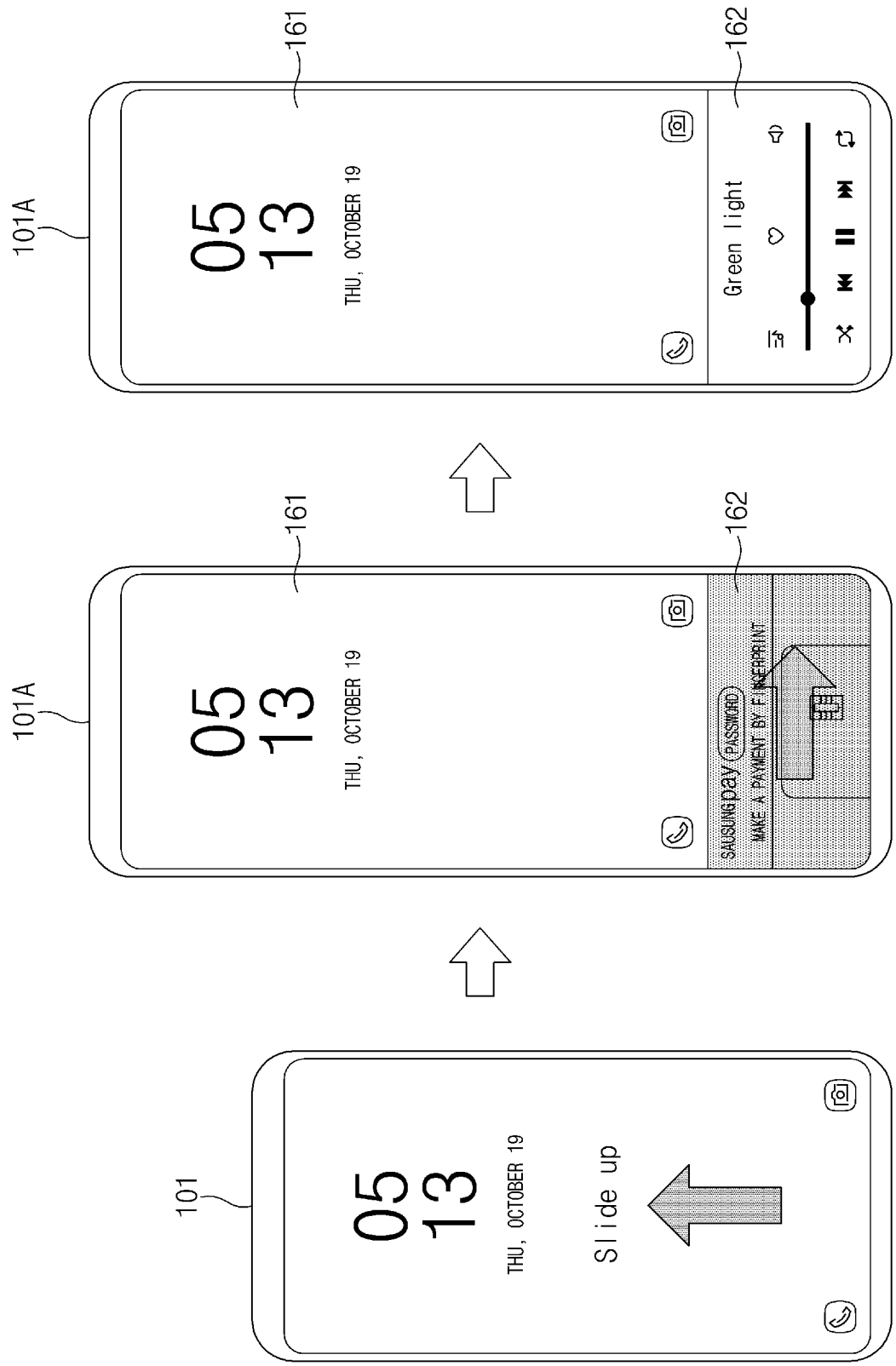
FIG. 7 are views illustrating an operation of an electronic device according to another embodiment.

FIG. 7 are views illustrating an operation of an electronic device according to another embodiment.

Referring to FIG. 7, when the display 160 expands while a lock screen is output, the electronic device 101A may output a designated application in the ductile area 162. The designated application may be an application (e.g., Samsung pay) that requires additional authentication for actual execution.

As shown in FIG. 7, when the display 160 is expanded while the lock screen is currently being outputted, the electronic device 101A may output a payment application in the ductile area 162. In this case, the execution screen of the payment application in the ductile area 162 may be limited to only an image of a card, and the additional authentication may be required for actual payment. For instance, the user may execute payment by inputting a password in a field displayed in the ductile area 162 or through fingerprint authentication or iris authentication when the user operates the appropriate sensor (e.g. fingerprint sensor or iris sensor).

According to an embodiment, although the display 160 is expanded, the lock screen may be maintained in the rigid area 161. The user may turn off the lock screen by inputting his or her password in a filed displayed in the rigid area 161 or through fingerprint or iris authentication. When the lock screen is turned off, the electronic device 101A may output the home screen in the rigid area 161, and the user may thereafter execute one of various applications whose icons are displayed in the home screen.

According to an embodiment, when the user swipes the ductile area 162 while the designated application (e.g., Samsung pay) is output, the electronic device 101A may output another application. In this case, an application that does not require the authentication may be executed. For instance, when the user swipes the ductile area 162 while the designated application is output, the electronic device 101A may output a music application or an Internet browser in the ductile area 162.

The electronic device according to an embodiment of the present disclosure may include a cover glass, a back cover facing the cover glass, a display including a rigid area exposed through the cover glass, in which a first application is output, and a ductile area extending from the rigid area, and a processor electrically connected to the display. When at least a portion of the ductile area is exposed due to a pressure applied to the cover glass or the back cover, the processor may output the first application in a first area which is a portion of the rigid area and the ductile area, may output a second application in a second area which is a remaining portion of the rigid area, and may output a navigation bar in the ductile area, the navigation bar used to control display of content in the first area and the second area.

According to an embodiment of the present disclosure, responsive to a user's input that selects the first area or the second area, the processor may control an edge of the selected first area or the selected second area to emit light in a designated color.

According to an embodiment of the present disclosure, the navigation bar may display an interface to control the selected first area or the selected second area.

According to an embodiment of the present disclosure, the processor may change the second application in the second area in response to a user's input that swipes the navigation bar.

According to an embodiment of the present disclosure, the processor may change a position at which the first application is output and a position at which the second application is output with respect to each other in response to a user's input on a switch key included in the navigation bar.

According to an embodiment of the present disclosure, the navigation bar may include at least one of a home key, a back key, and a menu key.

According to an embodiment of the present disclosure, the processor may control content displayed in the first area in response to a user's input that touches one of the home key, the back key, and the menu key.

According to an embodiment of the present disclosure, the processor may display a designated application list in the second area.

According to an embodiment of the present disclosure, responsive to a user's input that selects one application in the designated application list, the processor may output the selected one application in the second area.

According to an embodiment of the present disclosure, the electronic device may further include a memory that stores the designated application list.

The electronic device according to an embodiment of the present disclosure may include a cover glass, a back cover facing the cover glass, a display including a rigid area exposed through the cover glass, in which a first application is output, and a ductile area extending from the rigid area, and a processor electrically connected to the display. When at least a portion of the ductile area is exposed due to a pressure applied to the cover glass or the back cover, the processor may output a second application in the ductile area and may output a navigation bar in the ductile area, the navigation bar used to control display of content in the rigid area and the ductile area.

According to an embodiment of the present disclosure, the first application corresponds to a lock screen that restricts use of the electronic device, and the second application corresponds to a payment application.

According to an embodiment of the present disclosure, the processor may unlock the electronic device when a user authentication required by the lock screen is completed.

According to an embodiment of the present disclosure, the processor may execute a payment when a user authentication required by the payment application is completed.

According to an embodiment of the present disclosure, responsive to a user's input that selects the rigid area or the ductile area, the processor may control an edge of the selected rigid area or the selected ductile area to emit light in a designated brightness.

According to an embodiment of the present disclosure, the navigation bar may display an interface to control the selected rigid area or the selected ductile area.

According to an embodiment of the present disclosure, the processor may change the first application in the rigid area in response to a user's input that swipes the navigation bar.

According to an embodiment of the present disclosure, the processor may change a position at which the first application is output and a position at which the second application is output with respect to each other in response to a user's input on a switch key included in the navigation bar.

According to an embodiment of the present disclosure, the navigation bar may include at least one of a home key, a back key, and a menu key.

According to an embodiment of the present disclosure, the processor may control content displayed in the ductile area in response to a user's input on one of the home key, the back key, and the menu key.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The processor described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a cover glass;
a back cover facing the cover glass;
a display including a rigid area exposed through the cover glass, and a ductile area extending from the rigid area; and
a processor electrically connected to the display, wherein the processor is configured to:
display a first application on the rigid area of the display; and
based on at least a portion of the ductile area being exposed due to a pressure applied to the cover glass or the back cover:
arranging the first application to be maintained in a constant position of the display relative to a bottom edge of the electronic device despite the extension of the electronic device via exposure of the ductile area by: removing the first application from a first area of the rigid area, and displaying a second application in the first area from which the first application is removed, and displaying the first application to a second area, the second area including a remaining portion of the rigid area outside the first area, and the ductile area,
outputting a navigation bar in the ductile area,
receiving an input selecting one of the first area and the second area, and
controlling the selected area of the first area or the second area by the navigation bar based on the received input.

2. The electronic device of claim 1, wherein responsive to the received input, the processor is further configured to emit light in a designated color along the selected area of the first area or the second area.

3. The electronic device of claim 2, wherein the navigation bar displays an interface to control the selected area of the first area or the second area.

4. The electronic device of claim 1, wherein the processor is further configured to change the second application output in the first area in response to a user's input that swipes the navigation bar, and
wherein the rigid area is disposed adjacently above the ductile area, and removing the first application for display from the first area includes a shift in position of the first application downwards away from a top terminal edge of the electronic device and into the ductile area.

5. The electronic device of claim 1, wherein the processor is further configured to change a position at which the first application is output and a position at which the second application is output with respect to each other in response to a user's input on a switch key included in the navigation bar.

6. The electronic device of claim 1, wherein the navigation bar includes at least one of a home key, a back key, and a menu key.

7. The electronic device of claim 6, wherein the processor is further configured to control content displayed in the selected area of the first area or the second area in response to a user's input on one of the home key, the back key, and the menu key.

8. The electronic device of claim 1, wherein the processor is further configured to display a designated application list in the first area.

9. The electronic device of claim 8, wherein, responsive to a user's input that selects one application in the designated application list, the processor is further configured to output the selected one application in the first area.

10. The electronic device of claim 8, further comprising a memory that stores the designated application list.

11. An electronic device comprising:
a cover glass;
a back cover facing the cover glass;
a display including a rigid area exposed through the cover glass and a ductile area extending from the rigid area; and
a processor electrically connected to the display, wherein the processor is configured to:
display a first application on the rigid area of the display; and
when at least a portion of the ductile area is exposed due to a pressure applied to the cover glass or the back cover:
arranging the first application to be maintained in a constant position of the display despite exposure of the ductile area by: removing the first application from a first area of the rigid area, outputting a second application in the first area from which the first application is removed, and displaying the first application to a second area, the second area including a remaining portion of the rigid area outside the first area, and the ductile area;
outputting a navigation bar in the ductile area;
receiving an input for selecting one of the rigid area and the ductile area, and
controlling a selected area of the rigid area or the ductile area by the navigation bar based on the received input.

12. The electronic device of claim 11, wherein the first application corresponds to a lock screen that restricts use of the electronic device, and the second application corresponds to a payment application.

13. The electronic device of claim 12, wherein the processor is further configured to unlock the electronic device when a user authentication required by the lock screen is completed.

14. The electronic device of claim 12, wherein the processor is further configured to execute a payment when a user authentication required by the payment application is completed.

15. The electronic device of claim 11, wherein responsive to the received input, the processor is configured to control an edge of the selected area of the rigid area or the ductile area to emit light in a designated brightness.

16. The electronic device of claim 15, wherein the navigation bar displays an interface to control the selected area of the rigid area or the ductile area.

17. The electronic device of claim 11, wherein the processor is further configured to change the first application in the rigid area in response to a user's input that swipes the navigation bar.

18. The electronic device of claim 11, wherein the processor is further configured to change a position at which the first application is output and a position at which the second application is output with respect to each other in response to a user's input on a switch key included in the navigation bar.

19. The electronic device of claim 11, wherein the navigation bar is configured to include at least one of a home key, a back key, and a menu key.

20. The electronic device of claim 19, wherein the processor is further configured to control content displayed in the selected area of the rigid area or the ductile area in response to a user's input on one of the home key, the back key, and the menu key.

* * * * *